United States Patent [19]
Schlichting

[11] 3,771,596
[45] Nov. 13, 1973

[54] INDUSTRIAL TECHNIQUE
[75] Inventor: John Schlichting, Akron, Ohio
[73] Assignee: The Babcock & Wilcox Company, New York, N.Y.
[22] Filed: Oct. 27, 1971
[21] Appl. No.: 193,108

[52] U.S. Cl. .............................................. 165/158
[51] Int. Cl. ............................................. F28f 9/02
[58] Field of Search ............................. 165/158–161

[56] References Cited
UNITED STATES PATENTS
3,635,287  1/1972  Sprague ............................. 165/158

Primary Examiner—Charles Sukalo
Attorney—J. Maguire

[57] ABSTRACT

An illustrative embodiment of the invention alleviates the stresses that are caused by the application of relatively cold feedwater to a heat exchanger tube sheet. The colder feedwater that characterizes a low load condition in a nuclear power plant is admitted to the heat exchanger riser chamber that is adjacent to the primary coolant outlet head tube sheet by way of an inlet bypass system. The bypass prevents the thermal shock that otherwise would have resulted from the exposure of the tube sheet on the one side to cold inlet feedwater and, on the other side, to a very hot primary coolant. As the feedwater temperature increases with the power plant load and approaches the primary coolant outlet temperature, the bypass system is turned off. The main feedwater inlet nozzle then discharges into the heat exchanger in an essentially direct fluid communication with the tube sheet.

1 Claim, 1 Drawing Figure

Patented Nov. 13, 1973
3,771,596
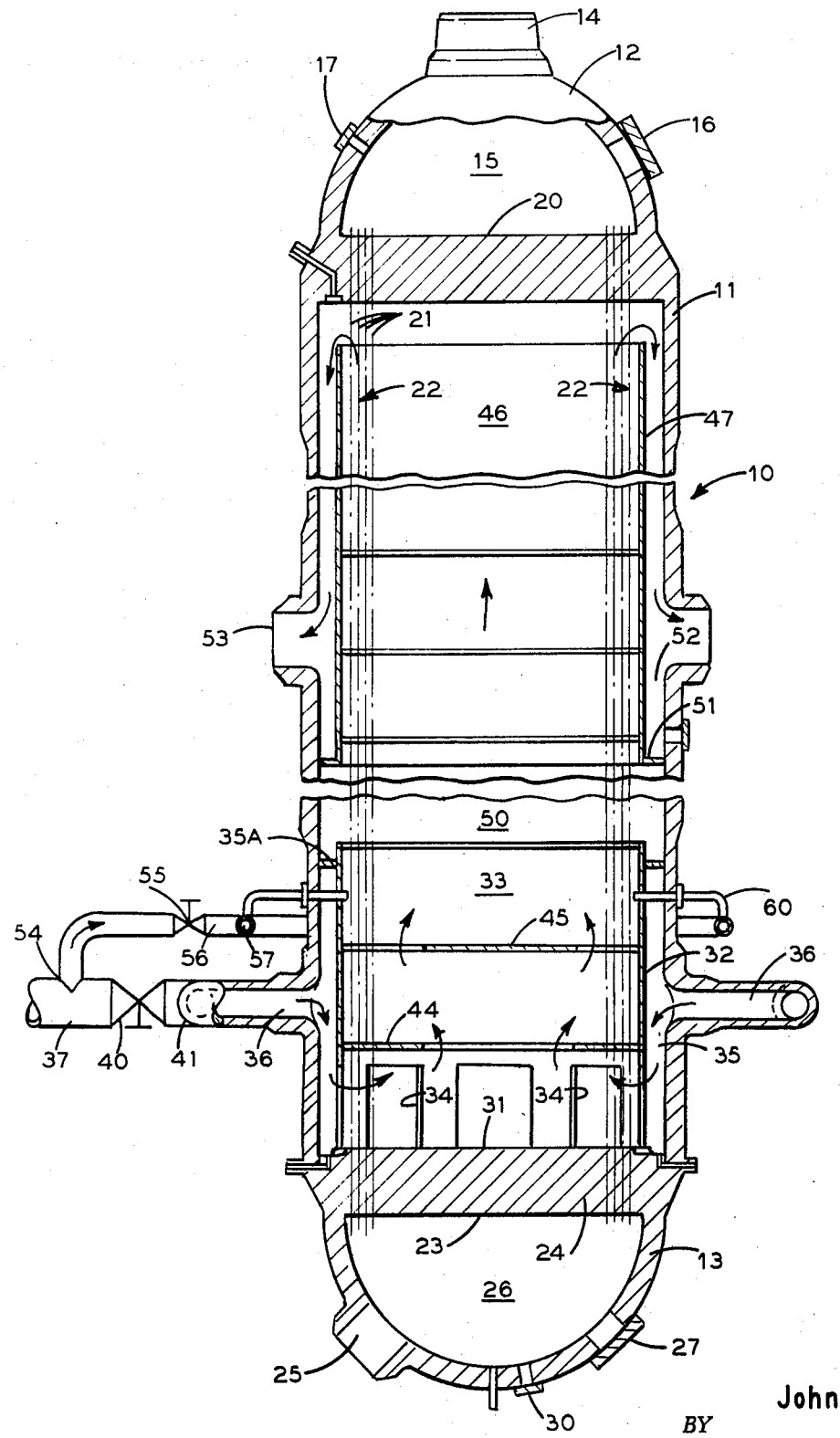
INVENTOR.
John Schlichting
BY
*J. Maguire*
ATTORNEY

INDUSTRIAL TECHNIQUE

BACKGROUND OF THE INVENTION

1. Field of the Invention

This invention relates to heat exhangers, and more particularly, to methods and apparatus for reducing thermal shock to heat exchanger tube sheets, and the like.

2. Description of the Prior Art

Transferring heat from one fluid to another is a common industrial operation. Refineries and chemical processing plants, as well as nuclear and conventionally fueled power plants are typical of the many different installations that make a widespread use of the heat exchanging equipment that is generally required to perform this function.

In a pressurized water nuclear power plant, for instance, a primary coolant fluid extracts heat from the reactor. This hot fluid is circulated to the inlet head of a heat exchanger. In this connection, the associated heat exchanger ordinarily has an inlet and an outlet head, respectively, for receiving and discharging the primary coolant. A bundle or bank of tubes provides primary coolant fluid communication between these two heads. The extreme ends of these tubes, moreover, are customarily anchored in flat tube sheets that serve as closures for the individual heads.

A pressure shell encloses the tube bundle in order to establish a chamber in which a secondary coolant fluid, flowing between the inside surface of the pressure shell and the outer surfaces of the tubes absorbs heat from the primary coolant that is within these tubes. The secondary coolant, usually admitted to this chamber through feedfluid inlets, after absorbing heat from the primary coolant is discharged from the heat exchanger through outlets for distribution to the electrical power generation equipment within the plant.

Because the primary coolant usually is under a pressure that is in excess of 2,000 pounds per square inch, many of the structural portions of the heat exchanger which are subjected to this high pressure necessarily must be formed from thick steel sections. This is especially noticeable in the tube sheets. Each tube sheet, for example, might be pierced by more than 15,000 holes in order to receive and secure the individual tubes in the associated bundle. To provide adequate structural integrity in these circumstances, the tube sheets can be as much as 24 inches thick.

The differences in the primary and secondary coolant temperatures that are experienced by the opposing tube sheet faces or surfaces, however, tend to produce thermal stresses. Thus, for example, steel responds to temperature changes by expanding or contracting, as appropriate, in accordance with its thermal expansion coefficient. This physical phenomenon, when applied to a thick heat exchanger tube sheet leads to a situation in which a relatively minor difference in the coolant fluid temperature generates unrelieved expansion forces of great magnitude. This situation is particularly aggravated in the tube sheets because thermal flow stresses, in general, are directly proportional to the thickness of the member, a thick member thereby undergoing a greater loading for a given temperature difference than a relatively thin member. If the temperature difference between the surfaces of a specific tube sheet is sufficiently great, the forces that are established may be relieved through a failure in the tube sheet or in some other part of the heat exchanger weldment.

Although the stress conditions that are generated at steady coolant flow and relatively constant thermal load usually can be overcome through proper design practices, the problem is more difficult in situations that amount to thermal cycling. For example, if the thermal stresses are not relieved through a failure in the heat exchanger as the coolant temperature differences fluctuate through a wide range, structural deterioration caused by metal fatigue nevertheless may result.

To avoid these difficulties, the tube banks in some heat exchangers are each equipped with an individual "economizer." In this context, an economizer is an array of transverse baffles situated near the secondary coolant inlet. Inflowing feedwater is discharged directly into the economizer baffle structure which temporarily segregates the colder feedwater from the outlet head tube sheet.

Auxiliary feedwater nozzles also have been provided to overcome this thermal stress problem. These nozzles discharge fluid directly into the tube bank if the flow through the main feedwater inlet is interrupted. This auxiliary feedwater discharge occurs, moreover, at a position in which the steam rising within the heat exchanger has been superheated, i.e., heated to a temperature that is greater than the vaporization temperature for the pressure established within the tube bank. With this configuration, any feedwater that might reach the primary coolant tube sheet has first passed through a substantial portion of the tube bank and been raised to an acceptable temperature.

A need nevertheless remains to provide industry with further alternative solutions to the problem of heat exchanger thermal stress in order to increase the range of available design possibilities.

SUMMARY OF THE INVENTION

In accordance with the invention, a further technique for alleviating some of these heat exchanger thermal stress difficulties is characterized by an auxiliary feedfluid inlet that discharges directly into the tube bank just above the outlet head tube sheet during start-up, low-load, or other conditions of reduced feedfluid temperature, as appropriate.

More particularly, a heat exchanger embodying principles of the invention has at least one main feedfluid inlet nozzle that discharges into a "downcomer" or annulus formed between the inner surface of the heat exchanger shell and a shroud, or wrapper, that encircles the portion of the tube bank that is adjacent to the primary coolant outlet head tube sheet. The downcomer causes the incoming fluid to flow down the annular passageway, across the face of the outlet head tube sheet and upwardly through the tube bank within the riser chamber that is established between the outer surfaces of the tubes and the inner surface of the shroud. It should be noted in this connection that the riser generally defines a volume in which the feedwater absorbs enough heat in order to volatilize into a saturated vapor, i.e. a vapor in which no water is held in suspension. At a full load, and steady operation, the temperature difference between the feedfluid flowing across the tube sheet and the primary coolant on the opposite side of the same tube sheet produces thermal stresses that can be anticipated and accepted within design limitations.

During reactor start-up, shut-down, or in partial load operation, the inlet feedfluid becomes relatively colder and, as a consequence, the temperature difference usually exceeds the acceptable range. In accordance with the invention, to prevent the development of potentially damaging thermal stresses at least one auxiliary feedfluid inlet protrudes through the heat exchanger shell, the downcomer annulus, and the shroud in order to discharge fluid directly into the riser chamber section of the tube bank that is just above the tube sheet. In this condition a valve is closed to stop flow through the main feedfluid inlet and thereby prevent the relatively cold liquid from contacting and thermally shocking the outlet head tube sheet.

It must be noted, however, that the auxiliary discharge nozzle should not be spaced too far from the outlet head tube sheet, otherwise the secondary coolant discharge pressure may tend to oscillate. In this connection it has been found that if no steam is generated below the level of the auxiliary feedfluid nozzle, the secondary coolant outlet pressure is stable. This pressure continues to remain stable, moreover, if a significant amount of steam is generated above the auxiliary feedfluid injection level. Pressure oscillations commence, however, if a significant amount of boiling takes place above and below the auxiliary feedfluid injection level.

In a further embodiment of the invention, the auxiliary feedfluid system can be arranged to discharge into the tube bank above an economizer section.

For a more detailed understanding of the present invention, reference is had to the following description taken in connection with the accompanying drawing, the scope of the invention being pointed out in the appended claims.

DESCRIPTION OF THE DRAWING

The sole FIGURE of the drawing is an illustrative representation of a heat exchanger in full section that embodies principles of the invention.

DESCRIPTION OF THE PREFERRED EMBODIMENTS

For a more complete appreciation of the invention, attention is invited to accompanying FIGURE of the drawing. For the purpose of illustration, the invention is described in connection with a heat exchanger 10 that transfers nuclear reactor generated heat from a primary coolant, usually pressurized water, to a secondary coolant. The heat exchanger 10 comprises a longitudinally elongated hollow cylindrical pressure vessel 11. The transverse ends of the vessel 11 are closed by a hemispherically shaped coolant inlet head member 12 on one end and a similar hemispherical primary coolant outlet head member 13 on the other end.

The inlet head member has an inlet connection 14 through which the hot primary coolant from the nuclear reactor (not shown) flows into a fluid inlet chamber 15.

To provide a means for access to the chamber 15 for routine maintenance and the like, the spherical portion of the head member 12 is provided with a manway 16 and an inspection port 17. The flat, or planar portion of the hemispherical head member 12 constitutes the primary coolant inlet head tube sheet 20. The inlet tube sheet is pierced by apertures (not shown) that accommodate individual tubes 21 in a tube bundle 22. Usually, the primary coolant inlet ends of the tubes 21 are received or secured in respective tube sheet apertures by belling, or the like.

The tube bundle 22 extends through the entire effective length of the heat exchanger 10 and terminates at the primary coolant side 23 of a planar outlet head tube sheet 24 that establishes the flat portion of the hemispherical outlet head 13. Much in the same manner as the head 12, the outlet head 13 is equipped with an outlet connection 25 which enables the primary coolant that passed into a fluid outlet chamber 26 from the tubes 21 to be discharged from the heat exchanger 10. A manway 27 and an inspection port 30, as well as a drain connection, are provided in the spherical portion of the outlet head member 13.

Individual tubes in the bundle 22 also are secured in the outlet head tube sheet 24 by belling, or the like, to insure a fluid-tight separation between the liquid on the primary coolant side 23 and secondary coolant side 31 of the outlet tube sheet 24. Illustratively, the tube bundle in a heat exchanger of the type under consideration can have as many as 15,000 individual tubes anchored in an outlet tube sheet 24 that is 24 inches thick.

The portion of the tube bundle which is adjacent to the outlet head tube sheet 24 is encircled by a hollow cylindrical wrapper or riser chamber shroud 32. The volume of the heat exchanger between the inner surface of the shroud 32 and the outer surfaces of the tubes 21 defines a riser chamber 33 which includes an economizer. The shroud 32 is bolted, or otherwise secured, to the secondary coolant side 31 of the outlet tube sheet 24. The portion of the shroud 32 that is adjacent to the secondary coolant side 31 has an array of apertures or waterports 34 that establish secondary coolant fluid communication between an annular downcomer 35 and the riser chamber 33.

As shown in the drawing, the downcomer 35 is formed between the inner surface of the portion of the pressure vessel 11 that is adjacent to the outlet head 13 and the outer surface of the shroud 32. Fluid communication through the end of the downcomer 35 that is away from the tube sheet 24 is blocked from the balance of the heat exchanger 10 by means of our annular flange 35 A that is secured to the inner surface of the pressure vessel 11 and the outer surface of the shroud 32 in a transverse plane that is close to the free edge of the shroud.

Feedwater is discharged into the downcomer 35 through nozzles 36. These nozzles are arranged in one general plane that is transverse to the longitudinal axis of the pressure vessel 11. The nozzles 36, moreover, each penetrate the cylindrical pressure vessel 11 in a radially inward direction and are in fluid communication with the downcomer 35 to enable fresh feedwater to be admitted to the heat exchanger 10 under normal, full load conditions.

Feedwater is supplied to the nozzles 36 through a path that includes a feedwater inlet conduit 37, a valve 40, and an inlet feedwater header 41.

In order to raise the feedwater to saturation temperature, an economizer is installed in the riser chamber 33. As shown, the economizer is located above the waterports 34. The economizer comprises a group of parallel baffles, shown for the purpose of illustration as a flat torodial plate 44 that is arranged concentrically with the longitudinal axis of the pressure vessel 11. A transversely arranged flat, circular disk 45, is centered with respect to the longitudinal axis of pressure vessel 11 and is located above the toroidal plate 44. The plate 44 and the disk 45 are fastened securely within the tube bundle to complete the economizer structure. As illustrated, feedwater that is discharged into the downcomer 35 from the main feedwater inlet nozzles 36 must flow through the tortuous path within the tube bundle 22 that is established by the economizer structure.

A superheating chamber 46 is defined by a further hollow, cylindrical wrapper or superheater shroud 47 that is positioned within and spaced from the surface of the pressure vessel 11. The shroud encircles that portion of the tube bundle 22 which is adjacent to the primary coolant inlet head tube sheet 20.

Superheater shroud 47 is secured within the heat exchanger 10 by a transversely disposed toroidal plate 51. Welding the outer edge of the plate 51 to the inner surface of the pressure vessel 11 and welding the plate's inner circumference to that end of the shroud 47 which establishes one side of a gap 50, moreover, prevents the steam that is generated above the economizer from flowing upward into an annular shaped outer passage or outlet compartment 52 that is formed between the outer surface of the superheater shroud 47 and inner surface of the pressure vessel 11.

In ordinary full-load operation, the secondary coolant steam in the superheating chamber is raised to a temperature that is greater than the saturation temperature at the pressure established within the chamber 46. This superheated steam flows over the unsecured edge of the superheater shroud 47 and across the secondary coolant side of the inlet head tube sheet 20 in order to discharge through outlet connections 53 by way of the annular outlet compartment 52. Feedwater, transformed into a superheated secondary coolant in the foregoing manner is piped to the turbine, condensers and other plant equipment, as required, to convert the reactor generated heat into electrical power.

In accordance with the invention, feedwater flow through the inlet conduit 37 to the header 41 is selectively interrupted by means of the valve 40. A wye connection 54 in the conduit 37 that is upstream from the valve 40 provides a means for discharging some of the feedwater in the conduit 37 directly into the riser chamber 33 through a path that includes a valve 55, an auxiliary feedwater conduit 56, an auxiliary feedwater header 57 and a group of nozzles 60. As illustrated in the drawing, each of the nozzles 60 penetrate the pressure vessel 11 in order to pass through the downcomer 35 and the riser chamber shroud 32 in order to discharge into the riser chamber 33 in a common plane that is transverse to the longitudinal axis of the pressure vessel 11. This plane is longitudinally spaced from the circular disc 45 and the torodial plate 44 that comprises the economizer.

In operation, as the thermal load through the heat exchanger 10 decreases, the difference between the inlet feedwater temperature at the secondary coolant side 31 of the outlet head tube sheet 24 and the temperature of the primary coolant side 23 of the tube sheet increases. Thus, the feedwater becomes relatively colder as the thermal load on the heat exchanger 10 decreases. In general, at about 50 percent load, the difference between the primary coolant outlet temperature and the temperature of the incoming secondary coolant feedwater exceeds the allowable limit for thermal shock stresses to the tube sheet 24.

In accordance with the invention, as the maximum acceptable temperature difference is approached, the valve 55 in the auxiliary feedwater conduit 56 is opened in order to discharge some of the fluid directly into the riser chamber 33 at the termination of the economizer in order to prevent the cold fluid from directly contacting the tube sheet 24. While the valve 55 is being opened, the valve 40 in the main feedwater inlet conduit 37 is being closed. In this manner the volume of cool feedwater that flows into direct contact with the tube sheet 24 is gradually reduced.

In a typical application of the invention, the burden of supplying secondary coolant feedwater to the heat exchanger 10 is borne entirely by the auxiliary feedwater conduit 56 in the range between zero feedwater flow and about 40 percent of the full load flow. To achieve this result, the main feed valve 40 is closed and the auxiliary feedwater valve 55 is fully open. In the range between 40 percent and 50 percent of full load flow, feedwater is supplied to the heat exchanger through both the auxiliary nozzles 60 and the main feed nozzles 36. In this range, the two valves 40 and 55 are in a partly open condition. Above approximately 50 percent of the full load feedwater flow, moreover, all requirements for secondary feedwater are met by means of the main feedwater discharge nozzles 36. Toward this last end, the main feedwater valve 40 is fully open and the auxiliary feedwater valve 55 is closed. Appropriate temperature probes (not shown) are distributed within the heat exchanger 10 in order to provide the measurements from which the decisions are based to manipulate the valves 40 and 55 in accordance with the foregoing principles.

As hereinbefore mentioned, the economizer is not an essential feature of the invention. A heat exchanger embodying the principles of the invention can function efficiently without an economizer, the specific structure shown in the drawing being provided only for the purpose of illustrative clarity.

Thus there has been provided in accordance with the invention a further technique for protecting tube sheets and other structural heat exchanger components from inordinate thermal stresses.

I claim:

1. A heat exchanger for generating superheated steam comprising a tube bundle, a first shroud surrounding a portion of said tube bundle to establish a riser chamber therewithin for vapor generation, at least one main feedfluid inlet nozzle disposed outside of said riser chamber and spaced from said first shroud to discharge feedfluid against said first shroud and to promote feedfluid flow along said shroud surface and into said tube bundle, at least one auxiliary feedfluid inlet nozzle protruding through said first shroud and disposed to discharge feedfluid directly into said riser chamber, an array of plates generally transverse to said tube bundle to establish an economizer within said riser chamber, said plates establishing said economizer being spaced from said auxiliary feedfluid inlet nozzle and receiving feedfluid that is discharged from said main feedfluid nozzle in order to raise said main nozzle feedfluid to a saturation temperature, valve means associated with said main and auxiliary feedfluid nozzles for selectively supplying said feedfluid to the heat exchanger through said nozzles, and a second shroud disposed about said tube bundle and spaced from said first riser chamber, said second shroud defining a superheating chamber in order to convert said saturation temperature feedfluid from said riser chamber into superheated steam.

* * * * *